US010354288B2

(12) United States Patent
Avedissian

(10) Patent No.: US 10,354,288 B2
(45) Date of Patent: Jul. 16, 2019

(54) SYSTEM FOR APPORTIONING REVENUE FOR MEDIA CONTENT DERIVED FROM AN ONLINE FEEDBACK COMMUNITY

(71) Applicant: Innovation Collective, LLC, Plano, TX (US)

(72) Inventor: Narbeh Avedissian, Studio City, CA (US)

(73) Assignee: Innovation Collective, LLC, Plano, TX (US)

( * ) Notice: Subject to any disclaimer, the term of this patent is extended or adjusted under 35 U.S.C. 154(b) by 136 days.

(21) Appl. No.: 14/045,235

(22) Filed: Oct. 3, 2013

(65) Prior Publication Data

US 2014/0032319 A1    Jan. 30, 2014

Related U.S. Application Data

(63) Continuation of application No. 11/687,658, filed on Mar. 18, 2007, which is a continuation-in-part of application No. 11/549,027, filed on Oct. 12, 2006.

(60) Provisional application No. 60/836,465, filed on Aug. 8, 2006.

(51) Int. Cl.
*G06Q 30/02* (2012.01)
*G06Q 30/06* (2012.01)
*G06Q 90/00* (2006.01)

(52) U.S. Cl.
CPC ..... *G06Q 30/0273* (2013.01); *G06Q 30/0601* (2013.01); *G06Q 90/00* (2013.01)

(58) Field of Classification Search
CPC . G06Q 30/0601; G06Q 90/00; G06Q 30/0273
USPC .................................. 705/26.1, 14.53, 14.46
See application file for complete search history.

(56) References Cited

U.S. PATENT DOCUMENTS

| | | | |
|---|---|---|---|
| 5,774,869 A | 6/1998 | Toader | |
| 5,911,131 A | 6/1999 | Vig | |
| 5,913,204 A | 6/1999 | Kelly | |
| 6,029,141 A | 2/2000 | Bezos et al. | |
| 6,073,127 A | 6/2000 | Lannert et al. | |
| 6,216,112 B1 | 4/2001 | Fuller et al. | |
| 6,248,946 B1 | 6/2001 | Dwek | |
| 6,317,881 B1 | 11/2001 | Shah-Nazaroff et al. | |
| 6,343,313 B1 | 1/2002 | Salesky et al. | |
| 6,363,356 B1 * | 3/2002 | Horstmann | 705/26.7 |
| 6,530,082 B1 | 3/2003 | Del Sesto et al. | |
| 6,578,008 B1 | 6/2003 | Chacker | |
| 6,691,158 B1 | 2/2004 | Douvikas | |

(Continued)

OTHER PUBLICATIONS

DialogSrchJul. 11, 2013/ Examiner Dialog search conducted Jul. 11, 2013.

(Continued)

*Primary Examiner* — Eric R Netzloff
(74) *Attorney, Agent, or Firm* — Knobbe, Martens, Olson & Bear LLP

(57) ABSTRACT

Uses media, for example audio, video or text performances that were integrated into an online community for feedback determinative of outcome, for digital distribution. Apportions compensation for a selected artist from revenue that may be generated through one or any combination of advertisement, services associated with artist's performance, and media sales. The media may include singing, instrumental music, rhythmic music, videos, and writings.

8 Claims, 2 Drawing Sheets

(56) References Cited

U.S. PATENT DOCUMENTS

| | | | |
|---|---|---|---|
| 6,968,243 B1 | 11/2005 | Oh | |
| 7,069,310 B1 | 6/2006 | Bartholomew | |
| 7,076,434 B1 | 7/2006 | Newman et al. | |
| 7,080,139 B1 | 7/2006 | Briggs et al. | |
| 7,087,829 B2 | 8/2006 | Hasegawa | |
| 7,096,080 B2 | 8/2006 | Asada | |
| 7,162,433 B1 | 1/2007 | Foroutan | |
| 7,191,023 B2 | 3/2007 | Williams | |
| 7,539,742 B2* | 5/2009 | Spector | 709/223 |
| 7,603,626 B2 | 10/2009 | Williams | |
| 7,720,707 B1* | 5/2010 | Mowry | 705/14.1 |
| 7,865,394 B1* | 1/2011 | Calloway et al. | 705/14.4 |
| 8,103,545 B2* | 1/2012 | Ramer et al. | 705/14.49 |
| 8,290,824 B1* | 10/2012 | Mesaros | 705/26.2 |
| 8,595,057 B2* | 11/2013 | Avedissian | 705/14.1 |
| 8,990,678 B2 | 3/2015 | Bedingfield | |
| 9,104,669 B1* | 8/2015 | Des Jardins | G06F 17/30029 |
| 2002/0038221 A1* | 3/2002 | Tiwary et al. | 705/1 |
| 2002/0065826 A1* | 5/2002 | Bell et al. | 707/10 |
| 2002/0087403 A1* | 7/2002 | Meyers et al. | 705/14 |
| 2002/0103695 A1 | 8/2002 | Urken et al. | |
| 2002/0112005 A1 | 8/2002 | Namlas | |
| 2002/0143607 A1 | 10/2002 | Connelly | |
| 2002/0152215 A1* | 10/2002 | Clark et al. | 707/10 |
| 2002/0198723 A1 | 12/2002 | Mowry | |
| 2003/0014310 A1* | 1/2003 | Jung et al. | 705/14 |
| 2003/0036944 A1 | 2/2003 | Lesandrini et al. | |
| 2003/0130894 A1* | 7/2003 | Huettner et al. | 705/14 |
| 2003/0079015 A1 | 8/2003 | Fein et al. | |
| 2003/0149574 A1 | 8/2003 | Rudman | |
| 2003/0171982 A1 | 9/2003 | Paul | |
| 2003/0187802 A1 | 10/2003 | Booth | |
| 2004/0003097 A1 | 1/2004 | Willis et al. | |
| 2004/0015427 A1* | 1/2004 | Camelio | 705/35 |
| 2004/0093236 A1 | 5/2004 | Chacker | |
| 2004/0093249 A1* | 5/2004 | Chacker | 705/7 |
| 2004/0103024 A1* | 5/2004 | Patel et al. | 705/14 |
| 2005/0071865 A1 | 3/2005 | Martins | |
| 2005/0120389 A1 | 6/2005 | Boss et al. | |
| 2005/0246377 A1 | 11/2005 | Faso | |
| 2005/0273489 A1 | 12/2005 | Pecht | |
| 2005/0276246 A1 | 12/2005 | Walker et al. | |
| 2005/0283753 A1 | 12/2005 | Ho | |
| 2006/0026593 A1 | 2/2006 | Canning et al. | |
| 2006/0074753 A1* | 4/2006 | Schuh et al. | 705/14 |
| 2006/0106675 A1 | 5/2006 | Cohen et al. | |
| 2006/0143068 A1 | 6/2006 | Calabria | |
| 2006/0149681 A1 | 7/2006 | Meisner | |
| 2006/0155575 A1 | 7/2006 | Gross | |
| 2006/0212350 A1* | 9/2006 | Ellis et al. | 705/14 |
| 2006/0212367 A1 | 9/2006 | Gross | |
| 2006/0229993 A1 | 10/2006 | Cole | |
| 2006/0242139 A1 | 10/2006 | Butterfield et al. | |
| 2006/0242269 A1 | 10/2006 | Gross | |
| 2006/0242554 A1* | 10/2006 | Gerace et al. | 715/501.1 |
| 2006/0218153 A1 | 11/2006 | Voon et al. | |
| 2006/0251399 A1 | 11/2006 | Agarwal et al. | |
| 2006/0253599 A1 | 11/2006 | Monteiro et al. | |
| 2006/0287916 A1* | 12/2006 | Starr et al. | 705/14 |
| 2006/0292541 A1 | 12/2006 | Ehmann | |
| 2007/0044639 A1 | 3/2007 | Farbood et al. | |
| 2007/0073625 A1* | 3/2007 | Shelton | 705/59 |
| 2007/0112762 A1* | 5/2007 | Brubaker | 707/5 |
| 2007/0156507 A1* | 7/2007 | Connelly et al. | 705/10 |
| 2007/0233564 A1* | 10/2007 | Arnold | G06Q 30/02 705/14.46 |
| 2007/0243509 A1 | 10/2007 | Stiebel | |
| 2007/0282813 A1* | 12/2007 | Cao et al. | 707/3 |
| 2007/0294177 A1 | 12/2007 | Volk et al. | |
| 2008/0034066 A1 | 2/2008 | Shamus et al. | |
| 2008/0050713 A1 | 2/2008 | Avedissian | |
| 2008/0050714 A1 | 2/2008 | Avedissian | |
| 2008/0082417 A1* | 4/2008 | Publicover | 705/14 |
| 2008/0104626 A1 | 5/2008 | Avedissian | |
| 2008/0104627 A1* | 5/2008 | Avedissian | 725/25 |
| 2008/0262931 A1 | 10/2008 | Chan et al. | |
| 2009/0116668 A1* | 5/2009 | Davidson | 381/119 |
| 2009/0192972 A1* | 7/2009 | Spivack et al. | 706/50 |
| 2009/0228347 A1* | 9/2009 | Spector | 705/10 |
| 2009/0287532 A1 | 11/2009 | Cohen et al. | |

OTHER PUBLICATIONS

Havighurst, Craig, "Webcasters say proposed royalty rate will put them out of business," Byline (Business; p. 1E); Jul. 1, 2002.

Mowatt, Raoul V., in "Web radio royalty rate Postponed" (Metro; zone: n; p. 2), May 22, 2002.

Webpage from www.MySpace.com, Selecting MySpace Music; captured Aug. 9, 2007, original publication date Unknown.

Webpage from www.MySpace.com, Selecting MySpace Ringtones; captured Aug. 9, 2007, original publication date Unknown.

Webpage from www.YouTube.com, Selecting YouTube Community, captured Aug. 9, 2007, original publication date Unknown.

Webpage from www.YouTube.com, Selecting YouTube Contests, captured Aug. 9, 2007, original publication date Unknown.

Webpage from www.IdolUnderground.com, Selecting homepage, captured Aug. 9, 2007, original publication date Unknown.

Webpage from www.IdolUnderground.com, Selecting Idol Underground Competitions, captured Aug. 9, 2007, original publication date Unknown.

Webpage from www.MusicNation.com, Selecting homepage, captured Aug. 9, 2007, original publication date Unknown.

"What is Tonos?", pp. 1-3, http://www.tonos.com/app2/tonos/jsp/what_is_tonos.jsp, 2001-2002.

www.talentnetworks.com, 53 pages, Jun. 12, 2003.

Merriam-Webster's Collegiate Dictionary, Tenth Edition (Merriam-Webster, Incorporated 1998) at p. 1196.

Merriam-Webster's Collegiate Dictionary, Tenth Edition (Merriam-Webster, Incorporated 1998) at p. 380.

* cited by examiner

SYSTEM FOR APPORTIONING REVENUE FOR MEDIA CONTENT DERIVED FROM AN ONLINE FEEDBACK COMMUNITY

CROSS-REFERENCE TO RELATED APPLICATIONS

The present application is a continuation of U.S. Utility patent application Ser. No. 11/687,658 filed Mar. 18, 2007, which is a continuation in part of U.S. Utility patent application Ser. No. 11/549,027 filed Oct. 12, 2006, which claims benefit from U.S. Provisional Patent Application Ser. No. 60/836,465, filed Aug. 8, 2006, the contents of which are incorporated herein by reference in their entirety.

BACKGROUND OF THE INVENTION

Field of the Invention

The invention relates to the field of computer software and is more particularly, but not by way of limitation, directed to a system and method for selecting an artist meeting a certain threshold of votes and apportioning revenue derived from services associated with artist's performance data, and distribution of advertisement and artist's media content.

Description of the Related Art

There are numerous online social networking and communities that provide users with an interface for interacting with other users. In some cases, online social networking is combined with offline elements such as face-to-face events. The ability of users to buy products, obtain information from online services is revolutionizing the way business is done. The importance of the Internet as a tool of electronic commerce cannot be overstated.

Although the existing social networks are powerful tools for interacting with people who have similar interests, such communities are not organized for users who hold themselves out as having artistic talent to receive a part of revenue generated derived from byproducts of their artistic talent and popularity. There is a need for a system to select artists meeting a certain threshold of feedback and apportioning revenue derived from services based on network traffic associated with artist's performance data, and distribution of advertisement and artist's media content. Embodiments of the invention enable an opportunity for the independent community to utilize a platform that allows for monetization despite the impossible threshold of penetration into the major label and studio system that is run by a few tastemakers who select content for the masses. This allows a platform for independent artists to exploit their art and have a community of consumers/end users democratically determine what content they want to see more of. Hence, embodiments of the invention benefit the consumer and the independent artist, not the major labels and studios. Although a small percentage of artists are successful in penetrating the major label/studio system, embodiments of the invention provides a system that allows all artists to avail their content for the actual consumer to say yes or no and actually monetize immediately as opposed to waiting and hoping that an executive at one of the majors thinks they have what it takes. For at least these reasons, there is a need for a system for apportioning revenue for media content derived from an online feedback community.

SUMMARY OF THE INVENTION

One or more embodiments of the invention are directed to a system and method for providing one or more services to an artist or a group of artists (hereinafter "artist") meeting a certain threshold of feedback and apportioning revenue derived from services associated with artist's performance, and distribution of advertisement and artist's media content. The general methodology involves obtaining information about an artist and obtaining performance data associated with the artist. In certain embodiments, the performance data is a media file (e.g., audio, video, and/or text or any combination thereof). Once obtained this performance data is then exposed to the community for feedback in a manner that is determinative of the outcome associated with a particular artist. The community in general is formed from peers and other artists that generally have an interest in the artist's activities of genre but may also comprise users who enjoy participating in an online community where new artist content is plentiful. After meeting a certain threshold of feedback from the online community, a decision is made to extend an offer to the artist. Such offer may include one or more services to promote the artist, distribute the artist's performance data, and allow for revenue participation associated with such service. Another aspect relates to the administration and monetization of methods of use of the submitted performance data and/or artist's performance activity. In certain embodiments, the submitted performance data may be licensed for use by third parties for distribution through offline channels such as cell phones, podcasts, cable television, satellite television, and/or broadcast television. The submitted performance data may be licensed for reproduction on DVDs, videotapes and/or other formats for sale by the licensee. In embodiments, the artist would be able to opt-in to any licensing program.

Various types of artist activities benefit from use in association with one or more embodiments of the invention. As such, artist activities and are not limited solely to the performing arts but should be viewed as any creative activity that gives rise to a user base when made available online. In addition to music, video and other performances works of authorship such as blogs or other online commentary may be considered an artist activity.

The online community determines what artist activities should be further produced and provides the producing artist(s) to share in the advertising and other possible revenue streams once approval has been given. The invention enables the online community to control a performance's rise in popularity and enables one or more sources of revenue generated from the outcome associated with a particular artist. When a decision is made to select an artist, one or more services and associated revenue participation may be extended to artist. Such services includes, but not limited to, advertisement placement, marketing, sponsorship, touring, licensing, extensions to artist website/page, and/or distribution of artist's performance data. Some aspects of the service may include either offline and online elements, or both. The artist's submitted performance data may then be optionally offered for free or for sale. For example, sales occur in such cases where the system for obtaining media data or performance data is separate from a purchasing system. Submitted data can be synchronized with the purchasing system so that it becomes accessible for sale. The artist receives a portion of revenue generated through one or more services and the portion may be a fixed percentage or a percentage based on a sliding scale that adjusts automatically to the revenue generated from the services related to the artist performance data. This sliding scale is unique to advertising revenue participation and is an indirect measure of the artist's popularity. This enables an artist to receive revenue in free download environments and provides additional revenue to the artist in pay for download venues.

Embodiments in which submitted performance data meeting a certain threshold of feedback and then provided through a service might be viewed as providing a rich example of the variety of possibilities for optimal revenue participation and for the ability to relate such revenues directly to the service. Users might pay a fee for the service, pay on a subscription basis, pay per show, pay per download, or pay on some other basis. Advertisers, sponsors, or programmers might pay for such service and allow users, for example, to view submitted performance data for free. In other embodiments users are given everything but music and video downloads for free. Optionally revenue may be shared with users who generate business or traffic to the system by referring users and getting more and more referred business from artists and users.

Advertisers find the ability to couple advertisement with the artist's performance data to be very valuable, and might be expected to pay for such services based on criteria such as number of ad viewings for which viewing is possible (perhaps in a manner analogous to Web ad impressions, pay-per-impression), number for which advertisement a link is activated (perhaps in a manner analogous to click-throughs, pay-per-click), number of activations (such as if multiple activation opportunities per ad are provided, and also analogous to click-throughs), number of leads obtained (pay-per-lead), number of transactions completed (pay-per-transaction), or other such variations. Many of these and similar pricing schemes might be applicable to embodiments providing offline service as well, such as including advertisement in touring or live performance venue. A proportionate share of revenue for example can be paid out to an artist for performances conducted offline if that artist is one selected by the community. Hence television shows, plays, and any other type of performances that occur offline may still trigger a proportionate payment to the artist if the performing artist was initially chosen by the online community or viewers whose votes triggered the artist to be signed with a representative such as a record label or other entity promoting the artists work. In at least one embodiment of the invention, having been chosen by the community itself is not determinative of being able to obtain a proportionate share of revenue. An artist that becomes increasingly popular in the community as judged by page views, number of friends, fans or some other measure of popularity may obtain the same status as one originally elected by the community once a certain threshold is reached. An artist or user, for example, that has 1 million page views may qualify for a proportionate share of revenue on advertising, items sold and promoted on their personal profile page.

Submitted performance data can be optionally made available for distribution on a service as a ring tone data or a general media file that can be downloaded into a cell phone, media playable device, or other computation device where use of such files might be applicable. In the instance where the performance data is video, a user may download the video data for purchase via online distribution channels or be bought on various media through a third party distribution network.

By apportioning revenue with artist, artist has an incentive to provide performance data and refer users and other artists to the system. This helps the system build a network including an unlimited number of advertisers, getting more and more referred business from artists and users. At the same time, the system can reduce its own advertising ventures and expenses. Furthermore, through the use of user account, the system can apportion revenue with artist and end users, and for each of its various online sites that sell intangible and tangible items.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

Figure 1:
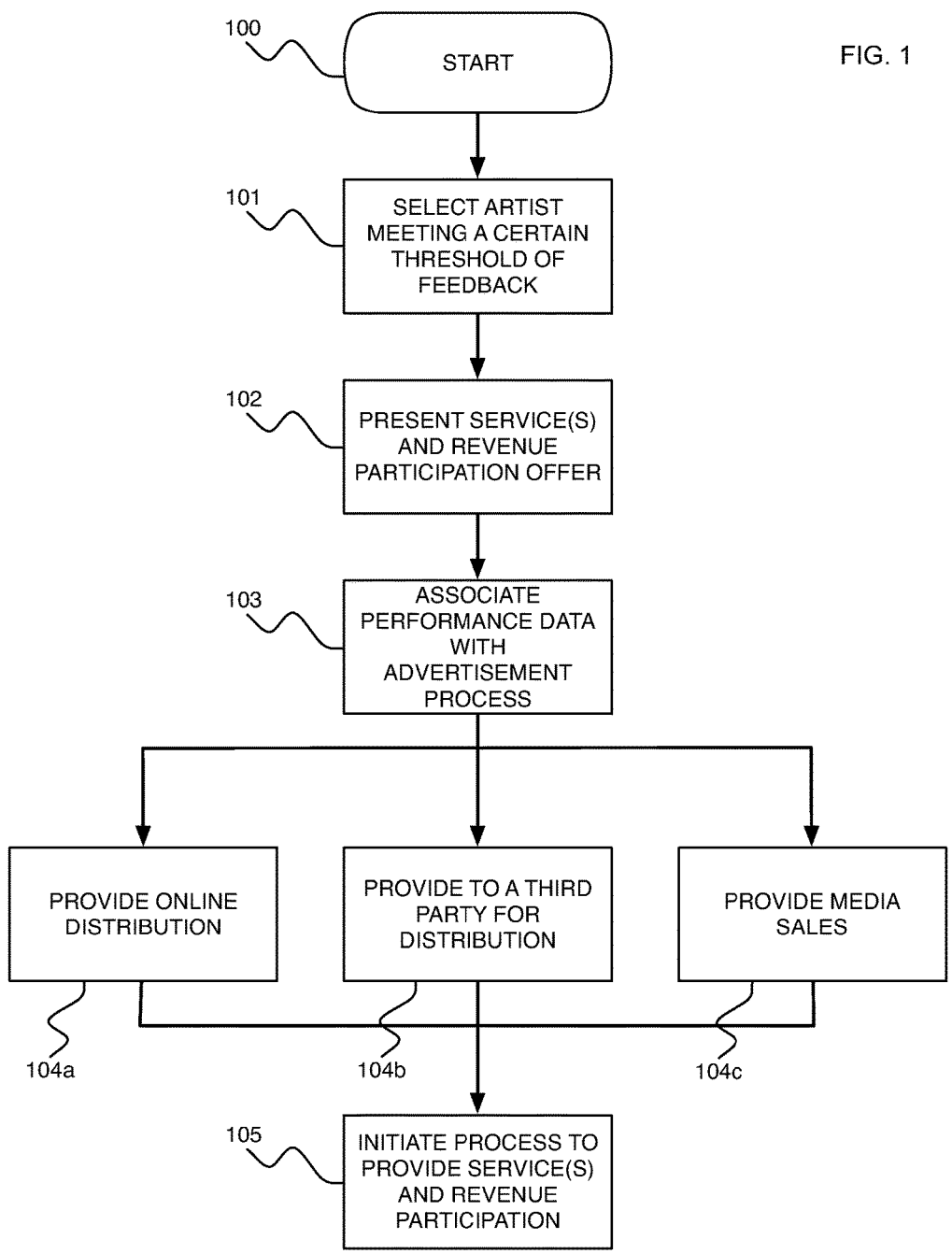
FIG. 1 is a flow diagram that illustrates the process for providing one or more services to artist meeting a certain threshold of feedback, apportionment of revenue derived from the services related to artist's performance activities and distribution of submitted performance data in accordance with one or more embodiments of the invention.

One or more embodiments of the invention are directed to a system and method for providing one or more services to artist meeting a certain threshold of feedback and apportion revenue derived from the services related to artist's performance activities and distribution of performance data. The description set forth herein is exemplary, rather than limiting, and many variations and modifications are within the scope and spirit of the invention. Although numerous specific details are set forth in order to provide a thorough understanding of the present invention, it will be apparent to one of ordinary skill in the art, that embodiments of the invention may be practiced without these specific details. In other instances, well-known features have not been described in detail in order to avoid unnecessarily obscuring the present invention.

The general methodology for obtaining and synchronizing performance data involves obtaining information about an artist and obtaining performance data associated with the artist. The term performance data refers to any artistic performance captured within a tangible medium such as computer memory. Such performances are typically recorded in audio or video form prior to or simultaneous with submission to the community. Although the example given here is discussed in the context of a musical performance readers should note that embodiments of the invention are equally applicable to other types of performances such as acting performances, comedy performance, dancing performances, video performances or works of art such as drawings, paintings or other visual renditions made by an artist.

Information related to the artist may be obtained in any manner including via telephonic communication or website based communication. Likewise, media such as performance data may be obtained over a telecommunication medium including a wireless or wire based telephone channel, or over an Internet based telephone channel for example. For example, personal profile pages employed by one or more embodiments of the invention allow for users to use a VoIP communication link (e.g., Skype™) to talk with friends and stream their playlist and content across the link. When an artist's performance is captured in video form that video and the accompanying audio data may be uploaded to the community for determination as to the popularity of the performance data. In addition, embodiments of the invention enable a user to create their own custom radio station on their personal profile page with their own playlist/content they may web cast from their personal page. Any method for users to access the custom station is in keeping with the spirit of the invention, including RSS, podcasting, email, text messaging, via a search engine or in any other manner.

In certain embodiments of the invention, services available to artist may include one or any combination of media production, marketing, artist management, sponsorship, media or performance data distribution, touring, and licensing. Service may be online and automated by a server process where providing such service through the server is applicable such as online distribution of submitted performance data. Other services may depend on an external intermediary such as a business manager or agent who provides the service initiated by a server process using a technological mean (e.g. email, user interface notification). Where online interfacing is applicable, presenting aspects of service to a user can be implemented using any graphical user interface or web interface configured to obtain data from a server and present the data. Any form of monetization arising from advertisements during the service provided to artist may be shared with the artist.

FIG. 1 is a flow diagram that illustrates the system for providing one or more services to artist meeting a certain threshold of feedback and apportion of revenue derived from the services related to artist's performance activities and distribution of submitted performance data in accordance with one or more embodiments of the invention. Processing typically occurs on a server coupled to a data repository and to a global communication network, which begins at 100. For a performance data exposed to the community for feedback in a manner that is determinative of the outcome associated with a particular artist, at step 101 the artist is selected on reaching a predetermined threshold condition or value of feedback generated from community rankings and feedback mechanisms. Any manner of determining a threshold condition or value for selecting artist including relative or fixed number of feedback, or qualitative or quantitative feedback condition is in keeping with the spirit of the invention. For example, but not limited to, selection of artist may occur upon reaching a threshold condition or value such as, e.g., 'when the ranking of submitted performance on a genre within the music category reaches Top 10,' or 'when the positive feedback on submitted performance data for a sub-category within the video category exceed 32% of the size of the registered users,' or 'when the artist is voted as a winner of an audition,' etc. Selection may take place periodically, e.g., weekly, or quarterly.

Revenue participation and service offer is presented at 102. Embodiments of the invention that present offers to a user can be implemented using any graphical user interface or web interface configured to obtain data from a server and present the data to a plurality of users. For instance a Skype™ or other such interface may provide a free interface between users and artist. The presentation of offers allows a selected artist to opt into one or more service. An offer may be dynamically generated prior to presentation depending on availability of one or more service and whether the service has a different threshold value or condition. For example, an additional service may be available for artist reaching a higher threshold value or condition. Services may also depend on a condition, which is recorded in a database, as set up by advertisers, sponsors, or programmers seeking a certain target audience. The selected artist is offered compensation from the revenue generated from advertisement on the artist or affiliate page and/or sale of any media with the submitted performance data. Advertisements may be in any form and include but are by no means limited to online advertisements. Video, image and other types of ads are in keeping with the spirit of the invention. Upon accepting an offer, artist's user account is configured to associate with a revenue participation process.

After presentation, submitted performance data is associated with advertisement process at 103. The advertisement process controls and tracks the instances or scores for viewing of advertisement retrieved from a data repository and displayed with the media contents of artist or affiliate page on the system. The advertisement process is coupled with the revenue participation process, which records the instances or scores of viewing advertisement on the user account of selected artist. In one embodiment of the invention popularity is determined by votes rather than a ranking although both alternatives are feasible. For advertisement on an offline service, advertisement media may be coupled with performance data or be displayed at a venue for artist's performance, such as a banner at the concert during artist touring or previewing advertisement video on media containing video of the submitted performance data. Keeping in the spirit of the invention to enable the revenue participation, any process that allows tracking of instances of advertisement such as number of ad viewings for which viewing is possible, number for which advertisement link is activated, number of activations, number of leads obtained, number of transactions completed, or other such variations.

Distribution of submitted performance data occurs at one or any combination of providing online distribution, providing to third party for distribution, and providing media sales at steps 104a, 104b, and 104c respectively. Submitted performance data may be synchronized with a purchasing system so that it becomes accessible. In another embodiment, submitted performance data may be available for free on online distribution 104a coupled with advertisement placement which in turn generates revenue using methods discussed herein. In these instances where the performance data is video, user may upload the video data for purchase via the Internet or be bought on various media through a third party distribution network. In these embodiments, the submitted performance data may be licensed for use by third parties for distribution through offline channels such as cell phones, podcasts, cable television, satellite television, and/or broadcast television. The licensee may license the submitted performance data for reproduction on DVDs, videotapes and/or other formats for sale.

Process to provide one or more service and associated revenue participation is enabled at 105. System may execute one or more processes to provide service and revenue participation as optioned by selected artist in the step 102. The revenue participation process tracks one or more revenue-generating activities (e.g. advertisement, distribution of artist's performance data, licensing, sponsorship, and touring) and apportions a percentage of revenue to the selected artist's user account. In certain embodiments, the service process may route email or establish telephone communication between a service provider intermediary and artist thus initiating the service, which is then provided to the artist by the service provider intermediary. For example, the process may notify a business manager by email via a global communication network to secure sponsorship for a selected artist. Such service provided by a service provider includes media production, marketing, artist management, sponsorship, trading or distribution, touring, and licensing.

Figure 2:
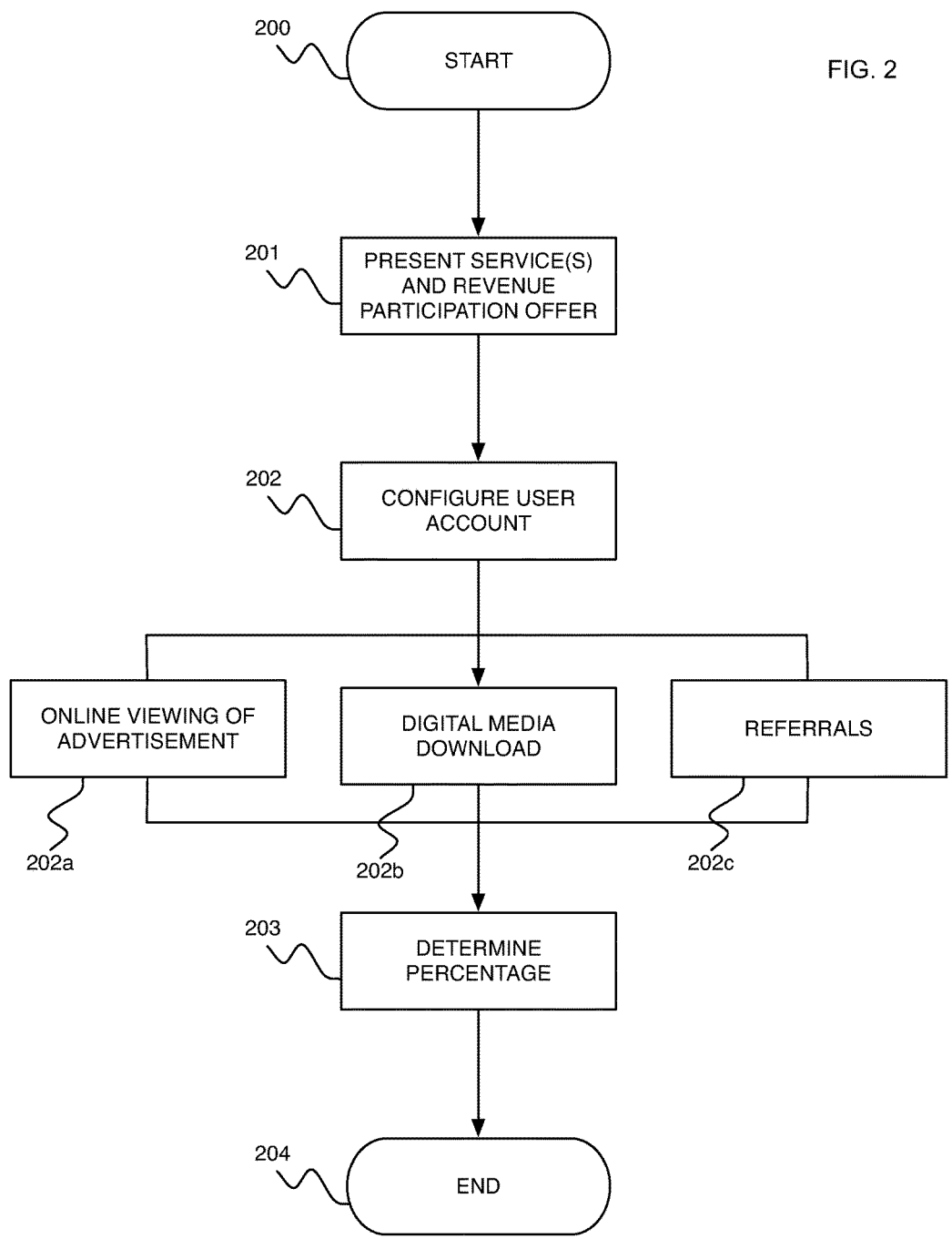
FIG. 2 is a flow diagram that illustrates an embodiment of revenue participation process.

FIG. 2 is a flow diagram that illustrates an embodiment of revenue participation process. Processing starts at 200. Revenue participation and service offer is presented at 201. Embodiments of the invention that present offers to a user can be implemented using any graphical user interface or web interface configured to obtain data from a server and present the data to a plurality of users. The presentation of offer 201 allows selected artist to opt into one or more service. An offer may be dynamically generated during the presentation depending on availability of one or more service and whether the offer of a service has a different threshold value or condition (e.g. sponsor looking for a winner of a music audition of a specific genre). Upon accepting offer, the user account of artist is configured at step 202 to allow a database to record on the user account and track scores or instances of one or a combination of revenue-generating sub processes such as online viewing of advertisement on the user's media content (e.g., webpage) 203a, digital media download of artist's performance data 203b, and/or online referrals initiated by the selected artist 203c.

Determination of percentage for apportioning revenue takes place periodically at step 203. Percentage is based on a sliding scale in which higher percentage of revenue is apportioned to the user account for a higher number of advertisement viewings 203a, digital downloads 203b, and referrals 203c. The determination of percentage may give a greater weight to one or more scores tracked from, for example, advertisement viewing 203a and digital media download of the artist's performance data 203b.

It will be appreciated that the above processes, and steps thereof, may be realized in hardware, software, or any combination of these suitable for a particular application. The hardware may include a server, general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language, an object oriented programming language, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a computer in a number of ways, or all of the functionality may be integrated into hardware. All such permutations and combinations are intended to fall within the scope of the present disclosure.

While the invention herein disclosed has been described by means of specific embodiments and applications thereof, numerous modifications and variations could be made thereto by those skilled in the art without departing from the scope of the invention set forth in the claims.

What is claimed is:

1. A multi-channel video distribution system, comprising:
an interface to a media file data repository accessible by one or more computers over a network;
a system comprising one or more microprocessors, programmable digital signal processors, and an application specific integrated circuit, the system configured to:
simultaneously record and stream, via the interface, to user devices at least a first video from a media submitter;
receive, over a communication network via the interface, uploads of a plurality of media files comprising a plurality of media files associated with the media submitter, one or more of the media files comprising performance data;
store, in the media file data repository, the plurality of media files in association with an account associated with said media submitter;
via an online profile page of the media submitter:
provide access to the plurality of media files to one or more user devices over the communication network;
enable users to communicate using a Voice over Internet Protocol communication mechanism;
provide a custom radio station comprising a streamable playlist;
provide a search engine configured to enable users to access the custom radio station;
synchronize one or more of the plurality of media files of the media submitter with a remote system that provides at least one alternate system for distributing the one or more of the plurality of media files;
track a number of instances of advertisements associated with offline distribution of the performance data of said media submitter's performance data;
track a number of views of a plurality of online items of performance data associated with advertisements;
dynamically generate an offer depending on availability of one or more services and whether the offer of a service has a different threshold value or condition, the dynamic generation of an offer comprising:
determine if a first predetermined threshold is met based at least in part on an aggregate number of views of the plurality of items of performance data associated with advertisements and the number of instances of advertisements associated with the offline distribution of the media submitter's performance data;
determine the availability of at least one service;
based at least in part on the availability of at least one service and the first predetermined threshold being met, dynamically generate a first offer of online and offline services;
enable a communication between the media submitter and one or more users;
at least partly in response to acceptance of the first offer online and offline services, enable the provision of the online and offline services.

2. The multi-channel video distribution system, as defined in claim 1, wherein the enablement of a communication between the media submitter and one or more users is provided via the online profile page of the media submitter using voice of internet protocol (VoIP).

3. The multi-channel video distribution system, as defined in claim 1, wherein the system is configured to enable performance data to be distributed via a plurality content sharing channels comprising podcasting and text messaging.

4. The multi-channel video distribution system, as defined in claim 1, wherein the system is configured to determine a service level based at least in part on differently weighted interactions related to the media submitter's performance data.

5. The multi-channel video distribution system, as defined in claim 1, wherein the first predetermined threshold relates to a ranking of submitted performance within a first category.

6. The multi-channel video distribution system, as defined in claim 1, wherein the first predetermined threshold relates to a percentage of submitted positive feedback.

7. The multi-channel video distribution system, as defined in claim 1, wherein the system is configured to monitor activations related to content, wherein at least one offer is provided to the media submitter based at least in part on the monitored activations.

8. The multi-channel video distribution system, as defined in claim 1, wherein the system is configured to enable distribution of performance data via cell phones.

\* \* \* \* \*